Figure 1:
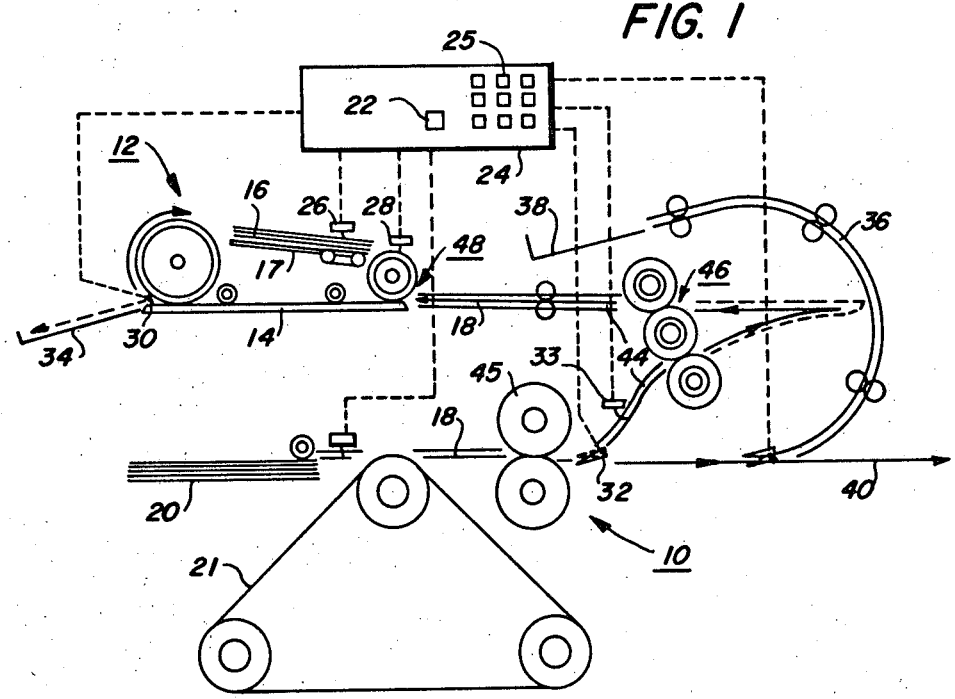

United States Patent [19]

Acquaviva

[11] 4,391,504
[45] Jul. 5, 1983

[54] RECIRCULATING COPY DOCUMENT

[75] Inventor: Thomas Acquaviva, Penfield, N.Y.

[73] Assignee: Xerox Corporation, Stamford, Conn.

[21] Appl. No.: 308,861

[22] Filed: Oct. 5, 1981

[51] Int. Cl.³ .......................................... G03G 21/00
[52] U.S. Cl. ................................ 355/3 SH; 271/3.1; 355/50
[58] Field of Search ................. 355/3 SH, 14 SH, 77, 355/50, 51; 271/3.1, 4

[56] References Cited

U.S. PATENT DOCUMENTS

| | | | |
|---|---|---|---|
| 3,682,095 | 8/1972 | Kaminstein et al. | 101/463 |
| 3,821,931 | 7/1974 | Yamaji et al. | 101/132 |
| 3,861,306 | 1/1975 | DuBois et al. | 101/450 |
| 3,963,345 | 6/1976 | Stemmle et al. | 355/50 |
| 3,977,780 | 8/1976 | Cassano et al. | 96/1 M |
| 4,062,061 | 12/1977 | Batchelor et al. | 364/900 |
| 4,076,408 | 2/1978 | Reid et al. | 355/14 |
| 4,078,787 | 3/1978 | Berlew et al. | 271/3.1 |
| 4,080,060 | 3/1978 | Nothman | 355/23 |
| 4,099,860 | 7/1978 | Connin | 355/14 |
| 4,116,558 | 9/1978 | Adamek et al. | 355/24 |
| 4,125,325 | 11/1978 | Batchelor et al. | 355/26 |
| 4,132,401 | 1/1979 | Gauronski et al. | 271/245 |
| 4,134,341 | 1/1979 | Weigele et al. | 101/142 |
| 4,144,550 | 3/1979 | Donohue et al. | 364/107 |
| 4,158,500 | 6/1979 | DiFrancesco et al. | 355/14 |
| 4,176,945 | 12/1979 | Holzhauser et al. | 355/23 |
| 4,179,215 | 12/1979 | Hage | 355/50 |
| 4,180,318 | 12/1979 | Matsumoto et al. | 355/11 |
| 4,192,607 | 3/1980 | Hage | 355/50 |
| 4,212,457 | 7/1980 | Guenther | 271/288 |
| 4,229,101 | 10/1980 | Hamlin et al. | 355/77 |
| 4,234,180 | 11/1980 | Looney | 271/3.1 |
| 4,278,344 | 7/1981 | Sahay | 355/14 |
| 4,284,270 | 8/1981 | Silverberg | 271/166 |

FOREIGN PATENT DOCUMENTS 56-19072 2/1981 Japan .

OTHER PUBLICATIONS

Wilson, William C., "Recirculating Feeder Operable in Single Sheet Feed Mode," U.K. Research Disclosure No. 16651, Feb. 1978, p. 37.

Research Disclosure, Apr. 1982, pp. 115–116, "Collated Duplex Copying Using a Simplex Feeder–Document Positioner."

Primary Examiner—R. L. Moses

[57] ABSTRACT

In a precollation copying apparatus with a recirculating document handler (RDH) in which a set of plural original document sheets is placed and normally plurally recirculated and copied once per circulation at the copier imaging station to produce a selected plural number of precollated copy sheet sets therefrom in a normal copy sheet output path, the improvement including a selectable alternative copy sheet path for feeding copy sheets from said normal copy sheet output path of said copier into an input station of said RDH with a selectably actuatable copy sheet output path deflector diverting a first set of copy sheets made from original document sheets into said alternative copy sheet path; and wherein the RDH automatically ejects the original document sheets without circulating them after they have been copied only once, and then the RDH automatically plurally recirculates the set of copy sheets in lieu of and as if they were original document sheets to copy the remainder of the selected number of copy sets from those copy sheets rather than original document sheets.

7 Claims, 4 Drawing Figures

RECIRCULATING COPY DOCUMENT

The present invention relates to precollation copying in which the original document sheets may be protected by being automatically replaced by a set of copy sheets which are recirculated instead of the original documents to provide the precollated copy sets.

For the faster xerographic and other copiers now in commercial use it is increasingly desirable to provide automatic handling of the individual original documents being copied in order to utilize those higher speed copying capabilities. However, the documents can vary widely in characteristics and condition, and must be protected against damage, excessive wear, or smearing of the marking indicia thereon.

A known desirable feature for an automatic document handling system for a copier is to provide document recirculations for precollation copying. As discussed, for example, in detail in U.S. Pat. No. 3,963,345, issued June 15, 1976, to D. J. Stemmle et al., at Columns 1-3, such precollation copying systems provide a number of important advantages. The copies exit the copier into a set collector already in precollated sets, and do not require subsequent sorting in a sorter or collator. On-line finishing and/or removal of completed copy sets may be provided while additional copy sets are being made from the same document set. Any desired number of such copy sets may be made by making a corresponding number of recirculations of the document set in collated order past a copying station and copying each document once each time it recirculates. A complete copy proof set is available from the first document set circulation.

Some examples of further details of recirculating document handlers (RDH) precollation copiers are disclosed in the following U.S. Pat. Nos.: 4,278,344 issued July 14, 1981 to R. B. Sahay; 4,284,270 issued Aug. 18, 1981 to M. Silverberg; 4,229,101 issued Oct. 21, 1980 to Hamlin, et al.; 4,212,457 issued July 15, 1980 to J. Guenther; and 4,234,180 issued Nov. 18, 1980 to J. H. Looney (all assigned to Xerox Corporation); 4,176,945 issued Dec. 4, 1979 to R. C. Holzhauser, et al. and 4,192,607 issued Mar. 11, 1980 to C. T. Hage (both assigned to Eastman Kodak Company). The other references cited in these references are also referenced herein.

As stated in said U.S. Pat. No. 4,229,101 at Col. 18, lines 25-32:

"Alternately, when the copier 10 and the RDH 20 is utilized for making simplex copies from duplex documents, this may be done in different ways. One known way would be to make one set of copies of the otherwise hidden sides of the duplex documents, e.g., all the even sides, and interleave those copies with the other documents to form in effect a pseudo-simplex document set which can then be copied as such."

However, a disadvantage of precollation copying systems is this fact that the documents must all be repeatedly recirculated and repeatedly individually copied a number of times equivalent to the desired number of copy sets. For example, to make 10 copy sets of a 5 page document set or book, one copy at a time can be made of each of the 5 document pages in this order: pages 1, 2, 3, 4, 5; 1, 2, 3, 4, 5; (or the reverse page order) repeated a total of 10 times to make the desired 10 copy sets. Thus, increased document recirculations are necessitated for a precollation copying system, with consequent increased likelihood of document jams and document wear or damage.

This is in contrast to a conventional post-collation copying system in which a large number of the desired copies are made at one time from each document page and collated subsequently. In such a post-collation copying system the document set need only be fed once, and each document multiply copied while stationary, to load the bins of the copy sheet sorter (collator) with collated copy sets. However, this is limited by the number of bins.

Most document sheet recirculators have an increased likelihood of document wear or damage or misregistration or misseparation with an increase in the number of times the sheets are recirculated, particularly where the sheets must be separated from a stack during each recirculation. This likelihood is greatly aggravated by abnormal documents, e.g. documents which are too thick, too thin, odd-sized, plastic, brittle with age, humid, stapled, curled, torn, wrinkled, etc. Certain documents are so valuable or delicate or of such characteristics that they should not be circulated at all, and the present invention is intended to protect them from such circulation, yet provide precollation copying thereof.

More specifically, it is well known in the copier art that certain original document sheets are too delicate for any document circulation or have properties which are likely to cause jams or misfeeds if circulation is attempted. It is also known that some documents, depending on the gentleness, reliability and feeding latitude of the document handler, may be able to take one or a few circulations but not an extensive number of circulations. This problem has therefore restricted the applicability or suitability of precollation copying, which normally requires circulation of the set of original documents by a number of circulations corresponding to the number of copy sets to be made therefrom.

As noted, non-precollation (post-collation) copiers, which also includes offset and other printers working from plates or masters made from original documents, do not have the subject problem. They make multiple copies at one time from each original master, and therefore do not need to circulate the original document sheet at all, much less repeatedly. That includes copiers in which the same latent image of the document or an electronically created image or a copy thereof fed to an exposure position is repeatedly copied or redeveloped in sequence such as Japanese Laid Open No. 56-19072 laid open Feb. 23, 1981, application No. 54-95811, filed July 25, 1979 by H. Hamaguchi (Sharp K. K.). The following disclose examples of automatic integral master-makers and duplicators: U.S. Pat. No. 3,682,095 issued Aug. 8, 1972 to B. Kaminstein, et al.; U.S. Pat. No. 3,821,931 issued July 2, 1974 to K. Yamaji, et al.; U.S. Pat. No. 3,861,306 issued Jan. 21, 1975 to R. C. DuBois; U.S. Pat. No. 4,080,060 issued Mar. 21, 1978 to G. A. Nothmann; and U.S. Pat. No. 4,134,341 issued Jan. 16, 1979 to R. Weigele, et al..

A known manual solution to this problem with xerographic copiers is to make a copy of each original document sheet in the document set on copy paper and then to manually reload in the document handler that copy set for recirculation as if it were the document set after the original document set has been copied and manually removed. Some examples describing this are disclosed in U.S. Pat. No. 3,977,780 issued Aug. 31, 1976 to J. R. Cassano, et al; U.S. Pat. No. 4,176,945 (supra) (see last sentence of Abstract, etc.); U.S. Pat. No. 4,192,607 (supra) (Note Col. 2, lines 3–40, etc.); and the U.K. Publication "Research Disclosure Bulletin," No. 16651, February 1978, p. 37. However, it will be appreciated that this manual intervention requires special copier operator training and sophistication and additional time.

In contrast the present invention automatically replaces the original documents with a copy set in the recirculating document handler for precollation copying, thereby overcoming the above-described problems.

A preferred feature disclosed herein is, in a copier in which a set of plural original document sheets is placed and normally plurally recirculated and copied once per circulation at the copier imaging station to produce a selected plural number of precollated copy sheet sets therefrom in a normal copy sheet output path, the improvement comprising: a selectable alternative copy sheet path for feeding copy sheets from said natural copy sheet output path of said copier into an input station of said recirculating document handler; selectably actuatable copy sheet output path deflector means for diverting only a first set of copy sheets made from original document sheets from said normal copy sheet output path into said alternative copy sheet path to said recirculating document handler; selectable non-circulating means in said recirculating document handler for automatically ejecting the original document sheets from said recirculating document handler after said original document sheets have been copied only once, and before said original document sheets are recirculated, even though plural copy sets have been selected to be made therefrom; and means for automatically plurally recirculating said first set of copy sheets in said recirculating document handler in lieu of and as if they were said original document sheets to copy the remainder of the selected number of plural copy sets from said first set of copy sheets rather than said original document sheets.

Further disclosed features include apparatus in which said alternative copy sheet path extends directly from the fuser of said copier into said recirculating document handler upon the actuation of said copy sheet output path deflector means; in which said copy sheet output path deflector means, and said selectable means in said recirculating document handler for ejecting the said original document sheets, are both actuated in response to an operator switch selection of a delicate original document sheet copying mode; in which said actuatable copy sheet output path deflector means is automatically deactuated after a first copy set has been fed to said recirculating document handler so that subsequent copy sheets are fed through said normal copy sheet output path; in which said deactuation of said copy sheet output path deflector means is controlled by counting original document sheets in the set thereof and actuating said output path deflector means after the passage of a corresponding number of copy sheets past said deflector means; in which said recirculating document handler normally recirculates sheets from the bottom of a stack thereof to be copied and back to top of said stack, and wherein said alternative copy sheet path feeds copy sheets onto the top of said stack as original document sheets are being fed from the bottom of said stack ejected after copying by said selectable non-circulating means rather than returned to said stack; or in which copy sheets from said first copy set are interleaved with pages in the copying of said original document sheets in said recirculating document handler for a document set exceeding a preset number of document sheets; in which said alternative copy sheet path feeds copy sheets to said imaging station through an alternative semi-automatic feeding input of said recirculating document handler and in which preset numbers of copy sheets are fed across the imaging station of the copier and stacked in said recirculating document handler interspersed between corresponding numbers of original documents fed thereto by said recirculating document handler; or in which said copy sheet output path deflector means, and said selectable means in said recirculating document handler for ejecting the said original document sheets, are both actuated automatically in response to the detection of misfeeding of original document sheets.

The present invention is not limited to any particular or specific type of copier or document illumination or optics system, and is applicable to, for example, either scanning lamp (stationary document) copying, or moving document (stationay optics) copying.

The prior art also includes various other patents teaching recirculating or non-recirculating document handlers and control systems therefor, such as U.S. Pat. Nos.: 4,062,061; 4,076,408; 4,078,787; 4,099,860; 4,125,325; 4,132,401; 4,144,550; 4,158,500; 4,176,945 (supra); 4,179,215; 4,229,101 (supra); 4,278,344 (supra); and 4,284,270 (supra).

Conventional simple software instructions in the copier's general microprocessor logic circuitry and software of document handler and copier control functions and logic, as taught by the above and other patents and various commerical copiers, is well known and preferred. However, it will be appreciated that the document feeding functions and systems disclosed herein may be alternatively conventionally and simply incorporated into a copier utilizing any other suitable or known software or hard wired logic systems, cam-bank switch controllers, etc.

All references cited are also incorporated by reference herein for appropriate teachings of additional or alternative details, features, and/or technical background.

Further features and advantages of the present invention pertain to the particular apparatus and steps whereby the above-mentioned features or advantages may be attained.

The invention will be better understood by reference to the following description of specific examples thereof, which includes the following drawing figures (approximately to scale) wherein:

FIGS. 1–4 are each schematic side views of four different recirculating document handler-precollation copier embodiments of the invention.

For simplicity, FIGS. 1–4 are schematic and show primarily the document and copy sheet paths discussed herein. However, it will be appreciated that further details are disclosed therefor in the above-cited references. Also, the above references teach alternative duplex document handling and duplex copying precollation systems which may be compatibly used with the invention.

In fact, the document inverters disclosed in the duplex document handlers cited may be used to invert the copy sheets placed in the document handlers if desired. However, the systems disclosed in the examples here automatically provide proper orientation (facing) of the copy sheets fed to the document handler.

All four embodiments of FIGS. 1–4 provide any desired number of precollated copy sets (selected by the operator and the conventional controller console switches). Yet wear or damage to the original documents is virtually eliminated, because they are fed and copied only once and then automatically ejected as described herein. The necessary multiple recirculations in the recirculating document handler for precollation copying are provided by automatically replacing the original set with a copy set as described herein and recirculating that copy set in the same RDH, thus sparing the originals all feeding, registering and copying dangers.

By an operator switch selection in the copier controller, the first set of copies may be automatically diverted to an input to the document handler, and meanwhile at the same time the originals are automatically ejected after they have been imaged only once to produce this first set of copies. The first set of copies is automatically fed into the document handler and then recirculated the required number of times to make the rest of the copies therefrom, i.e, one set of copies automatically becomes the "original" for multiple copy sets. The original documents may be automatically fed and directly ejected for stacking in a linear path which has less danger of document damage. Alternatively, they may be manually fed and copied.

Referring first to FIG. 1, there is shown a copier 10 with an RDH 12 over the copier imaging station (platen) 14. Document sheets 16 are fed from a stack thereof in tray 17 in the RDH 12 to the platen 14 for copying onto copy sheets 18 from copy sheet supply 20 via imaged photoreceptor 21. When a "delicate original" switch 22 on the copier controller 24 console is selected (pressed) or, alternatively, when the copier set counter switch 26 and fed document counter switch 28 indicate a document jam or misfeed condition, the controller 24 automatically switches the operation of the copier 10 onto the above-described mode of operation. That is, rather than normally circulating the documents 16 by a number of times equal to the number of copy sets selected on the copy count buttons 25 on the controller console 24, and regardless of that number selected, the controller 24 automatically activates gates or switches 30 and 32 as follows. Gate 30 is activated immediately to cause original document sheets 16 to eject directly and linearly from platen 14 into a tray 34 after being copied once, i.e. and not be recirculated or returned to the tray 17 to be restacked as would normally have occurred. All subsequent original documents are similarly fed out from the bottom of the stack copied only once and stacked in tray 34.

Meanwhile, the copies 18 made from the original documents 16 do not go to one of the normally selected copy sheet output paths 36 (to tray 38) or 40 (to a finisher). Instead, this first copy set is deflected by the deflector gate or fingers 32 actuated by controller 24. With deflector 32 actuated, those copy sheets are diverted into an alternative copy path 44 which extends directly from the copy sheet fuser 45 to an input station 48 of the RDH 12. Here, to provide proper face-down orientation of the copy sheets for subsequent copying on the platen, this alternate path 44 includes a conventional three-roller inverter 46.

As soon as the original documents 18 have been replaced in the RDH with copies 18 the RDH and copier return to their normal and conventional logic and operation for the remainder of that copy run. The document gate 30 can return to its normal circulation position and the deflector gate 32 can return to its normal copy output path position after the document set counter 26 drops to indicate that the last original document has been fed. The restoration of gate 32 may be delayed by a fixed time delay allowing the copy of the last original document to clear the gate 32. Alternatively a sheet sensor/counter 33 may be located in the alternative paper path 44 adjacent gate 32 and connected to controller 24 to compare the copy count there to the document feed count from counter 28 until they are equal. Note that a conventional modern copier has existing document and paper path counters and a microprocessor controller that automatically continuously keeps track of documents and copies, their counts and locations, in the microprocessor memory, in a known manner.

Figure 4:
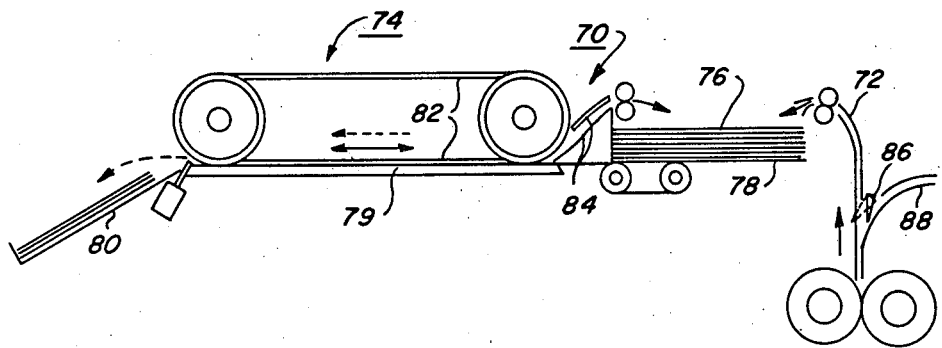

The term "input station" of the RDH is intended to encompass in the claims any input—either directly to the normal semi-automatic input (manual feeding input) 48 shown in FIG. 1 or input to the RDH stack on tray 17 here (as in the FIG. 4 embodiment). In the latter case, the inverter 46 would not be needed, since the RDH 12 here inverts the sheets as they are fed from tray 17 to platen 14.

Note that documents 16 are ejected to the left (downstream) of the platen while the replacement copies 18 are fed in from the right to avoid interference and allow simultaneous or overlapping in time document copying and replacement.

Figure 2:
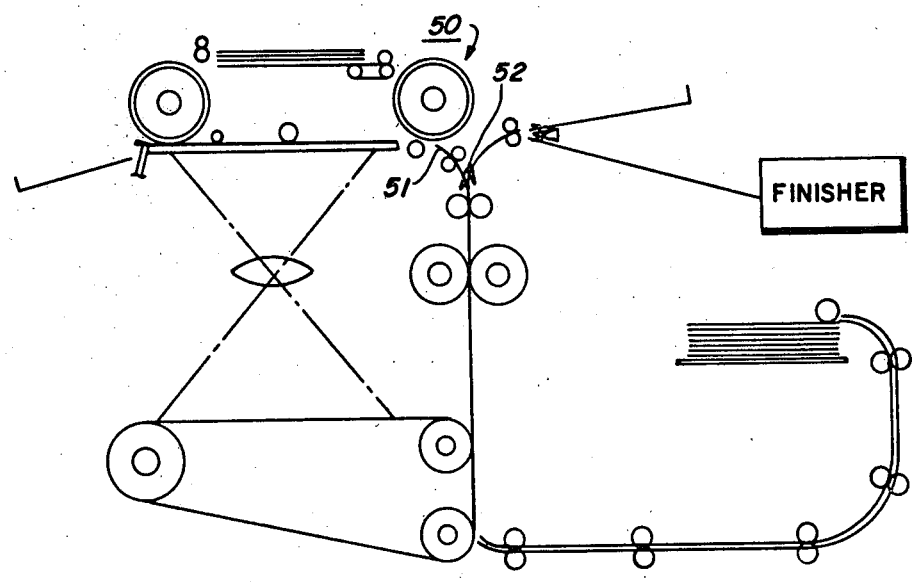
Figure 3:
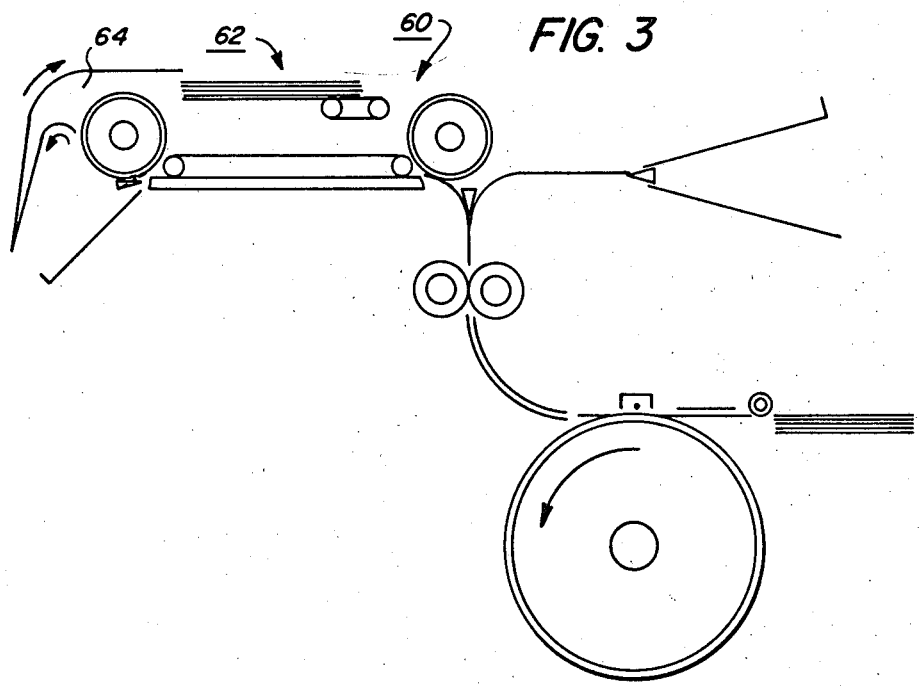

To avoid interference between the copying of the original documents and the feeding in of replacement copies via the platen as in FIGS. 1-3, when the number of documents exceeds a preset number (the number of copy sheets or "pitches" in the alternative path 44) a special "pause" sequencing can be used, in which only a preset partial number of the documents of the set are copied at a time, with a pause in document feeding therebetween to allow the copies therefrom to be fed into the RDH.

An example of the sequence used is shown below for a 12 page original document job in an N to 1 feeding order RDH with flash exposure, and assuming that the copier 10 paper path from image exposure to the feeding of the copy back to the platen area is 5 pitches long. The sequence would be to first feed, expose, and exit to tray 34, only the first five originals. Right behind the fifth original would come the corresponding first five copies across the platen. These are diverted by gate 30 after crossing the platen up to the document input tray 17. As the fifth copy crosses the platen, the sequence is repeated again by feeding the next 5 originals, and then their five copies. After that, the last two originals are fed and exited. Then after a three pitch pause, the last two copies reach the platen and are stacked into the document input tray. The page feeding sequence across the platen for this example is as follows:

| Originals | Copies | Originals | Copies | Originals | Copies |
| --- | --- | --- | --- | --- | --- |
| 12,11,10,9,8 | 12,11,10, 9,8 | 7,6,5,4,3 | 7,6,5,4,3 | 2,1,pause, pause, pause | 2,1 |
| Flashes | No Flashes | Flashes | No Flashes | Flashes on 2 and 1 | No Flashes |

The operation of original diverter gate 30 occurs after each of the above groups except the last. At this point all the originals 16 are in the original output tray 34 and all of the first copy set is in the document tray 17 awaiting the next feed, i.e. awaiting circulation. The copy handling diverter gate 32 changes position to feed the next set to either the finisher path 40 or output tray 38 path 36. If the originals were duplex (2-sided) they could then be reset in tray 17 to copy the other side.

An alternate sequence would accommodate SADH semi-automatic document input. The operator may wish to linearly hand feed originals such as thin (9 pound) sheets, delicate vellums or pasteups into SADH input 48 rather than trust them to even one auto-feed from tray 17. These documents can be hand inserted in the SADH slot 48 at the right of the RDH, fed across the platen automatically, diverted by gate 30, and restacked in the document tray. This is repeated until all originals are copied once. A "Ready" lamp may be used to signal the operator that the document or copy has cleared the platen and that the next original can be inserted.

Referring to the embodiment 50 of FIG. 2, it may be seen that it is very similar to FIG. 1. However, here the alternative paper path 51 selected by diverter 52 is much shorter and does not need an inverter. Likewise as to the embodiment 60 of FIG. 3. Note that the FIG. 3 RDH 62 has a document inverter 64 in its recirculation path.

Referring to FIG. 4, this embodiment 70 has several advantages. The alternative copy path 72 feeds the replacement copy sheets directly onto the top of the RDH 74 document stack 76 in the document tray 78. Documents may be automatically fed linearly (without bending, and therefore reduce misfeed potential) from the bottom of the stack tray 78 across the platen 79 to the document output tray 80 where they restack in the same order. Note that this path may compatibly also be used for SADH non-precollation copying as weell as for the "delicate document" mode herein. Since there is no interference between the copying of the documents and their replacement in tray 78, no pauses are required in the copying sequence as soon as the last original is fed out of tray 17, copied and ejected the first copy sheet (which is now on the bottom of tray 78) is fed to the platen, copied, and the RDH document belt 82 now reverses to drive the copy sheet back through guide (baffle) 84 to restack on top of stack 76. This is repeated for each copy sheet now in stack 76, for the number of circulations of the copy set needed to make the selected number of copy sets to be outputted through copy deflector 86 to the normal copy sheet output 88.

It will be appreciated that the embodiments described herein are merely exemplary, and other variations, modifications, refinements, or alternative embodiments may be provided by those skilled in the art. They are intended to be encompassed by the following claims.

I claim:

1. In a precollation copier with a recirculating document handler in which a set of plural original document sheets is placed and normally plurally recirculated and copied once per circulation at the copier imaging station to produce a selected plural number of precollated copy sheet sets therefrom in a normal copy sheet output path with a copy fuser, the improvement comprising:
   a selectable alternative copy sheet path for feeding copy sheets from said normal copy sheet output path of said copier into an input station of said recirculating document handler;
   selectably actuatable copy sheet output path deflector means for diverting only a first set of copy sheets made from original document sheets from said normal copy sheet output path into said alternative copy sheet path to said recirculating document handler; in which said alternative copy sheet path extends directly from the fuser of said copier into said recirculating document handler upon the actuation of said copy sheet output path deflector means;
   selectable non-circulating means in said recirculating document handler for automatically ejecting the original document sheets from said recirculating document handler after said original document sheets have been copied only once, and before said original document sheets are recirculated, even though plural copy sets have been selected to be made therefrom;
   and means for automatically plurally recirculating said first set of copy sheets in said recirculating document handler in lieu of and as if they were said original document sheets to copy the remainder of the selected number of plural copy sets from said first set of copy sheets rather than said original document sheets.

2. The apparatus according to claim 1 in which said copy sheet output path deflector means, and said selectable means in said recirculating document handler for ejecting the said original document sheets, are both actuated in response to an operator switch selection of a delicate original document sheet copying mode.

3. The apparatus according to claim 2 in which said actuatable copy sheet output path deflector means is automatically deactuated after a first copy set has been fed to said recirculating document handler so that subsequent copy sheets are fed through said normal copy sheet output path.

4. The apparatus according to claim 3 in which said deactuation of said copy sheet output path deflector means is controlled by counting original document sheets in the set thereof and actuating said output path deflector means after the passage of a corresponding number of copy sheets past said deflector means.

5. The apparatus according to claim 1 or 2 in which said recirculating document handler normally recirculates sheets from the bottom of a stack thereof to be copied and back to top of said stack, and wherein said alternative copy sheet path feeds copy sheets onto the top of said stack as original document sheets are being fed from the bottom of said stack and ejected after copying by said selectable non-circulating means rather than returned to said stack.

6. The apparatus according to claim 1 or 2 in which copy sheets from said first copy set are interleaved in feeding over the platen with pauses in the copying of said original document sheets in said recirculating document handler for a document set exceeding a preset number of document sheets.

7. The apparatus according to claim 1 or 2 in which said copy sheet output path deflector means, and said selectable means in said recirculating document handler for ejecting the said original document sheets, are both actuated automatically in response to the detection of misfeeding of original document sheets.

* * * * *